United States Patent [19]

Natori et al.

[11] Patent Number: 5,589,873
[45] Date of Patent: Dec. 31, 1996

[54] MULTIPOINT TELEVISION CONFERENCE SYSTEM WITH A MULTIPOINT CONTROL UNIT FOR REGISTERING INFORMATION ABOUT TV CONFERENCE ROOMS AND ROOM GROUPS AND ALLOWING A SELECTED ROOM TO PARTICIPATE IN THE TV CONFERENCE BASED ON REGISTERED INFORMATION

[75] Inventors: Hiroaki Natori; Hitoshi Takei; Shoichi Sano; Shoichi Tamuki, all of Kawasaki, Japan

[73] Assignee: Fujitsu Limited, Kanagawa, Japan

[21] Appl. No.: 413,178

[22] Filed: Mar. 30, 1995

[30] Foreign Application Priority Data

Jul. 20, 1994 [JP] Japan .................................. 6-167615

[51] Int. Cl.⁶ .................................................. H04M 3/56
[52] U.S. Cl. .............................. 348/15; 348/12; 348/13
[58] Field of Search .............................. 348/6, 7, 12, 13, 348/14, 15, 16, 17; 379/202, 203

[56] References Cited

U.S. PATENT DOCUMENTS

| | | | |
|---|---|---|---|
| 4,691,347 | 9/1987 | Stanley et al. ........................ | 379/203 |
| 5,099,510 | 3/1992 | Blinken, Jr. et al. .................. | 379/202 |
| 5,323,445 | 6/1994 | Nakatsuka ............................. | 348/15 |
| 5,369,694 | 11/1994 | Bales et al. ........................... | 379/202 X |
| 5,440,624 | 8/1995 | Schoof, II .............................. | 379/202 |

*Primary Examiner*—Victor R. Kostak
*Assistant Examiner*—Nathan J. Flynn

[57] ABSTRACT

A multipont TV conference system including a multipoint control unit connected with TV conference rooms through a communication network. The multipoint control unit includes: a register for registering names of TV conference rooms and groups, telephone numbers and seats of the rooms and flags indicating the room of a TV conference promoter, the room selected for participating the TV conference and the room not corresponding to calls from the multipoint control unit; and a control unit to control process, performed among the rooms by using registered matter in the register and images of the rooms, for selecting the room and the group, holding a TV conference, participating in a TV conference, intermediately participating in the TV conference and prohibiting the room not participating in a TV conference from observing images of and listening voice in other rooms under holding TV conferences.

8 Claims, 7 Drawing Sheets

| ROOM NAME | CALLING NUMBER | SEAT | GROUP NAME | M | S | E |
|---|---|---|---|---|---|---|
| SAPPORO | 011-SSS-PPPP | SAPPORO-SHI | I | | | |
| AOMORI | 0177-AA-NMNN | AOMORI-SHI | | | | |
| AKITA | 0188-AA-KKKK | AKITA-SHI | | | | |
| SENDAI | 022-SSS-DDDD | SENDAI-SHI | I | | | |
| TOKYO | 03-TTTT-KKKK | TOKYO-TO | | | | |
| YOKOHAMA | 045-YYY-HHHH | YOKOHAMA-SHI | II | I | | |
| NAGOYA | 052-NNN-GGGG | NAGOYA-SHI | | | | |
| KYOTO | 075-KKK-TTTT | KYOTO-SHI | | | I | |
| OSAKA | 06-MNO-SSSS | OSAKA-SHI | I | I | | |
| KOBE | 078-KKK-BBBB | KOBE-SHI | II | | | |
| HIROSHIMA | 082-HHH-SSSS | HIROSHIMA-SHI | I | | | |
| FUKUOKA | 092-FFF-KKKK | FUKUOKA-SHI | I | | | |
| KAGOSHIMA | 0992-KK-SSSS | KAGOSHIMA-SHI | II | | | |
| OKINAWA | 098-OKN-WWWW | NAHA-SHI | | | | |

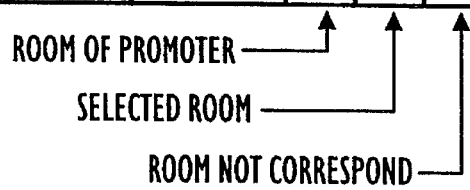

ROOM OF PROMOTER
SELECTED ROOM
ROOM NOT CORRESPOND

FIG. 3

```
[ STATE OF CONFERENCE ]

GROUP I    ⟹  ROOM 5
    GROUP II   ⟹  ROOM 3
    GROUP III  ⟹  UNUSED
    GROUP IV   ⟹  UNUSED
    GROUP V    ⟹  ROOM 3
         SELECT GROUP
```

FIG. 7A

```
[ PART-ROOM NAMES ]

--- GROUP I ---

SAPPORO SENDAI OSAKA HIROSHIMA
FUKUOKA

PARTICIPATE?

PARTICIPATE   NOT PARTICIPATE
```

FIG. 7B ( DURING CONFERENCE )

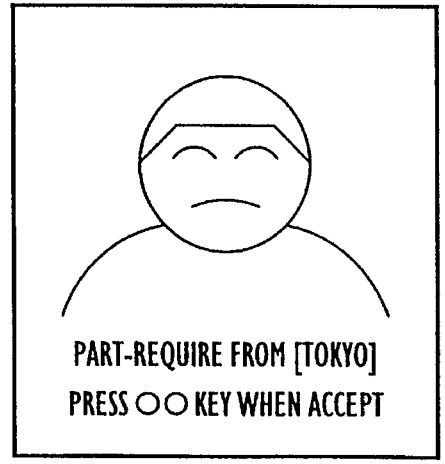

PART-REQUIRE FROM [TOKYO]
PRESS ○○ KEY WHEN ACCEPT

FIG. 7C

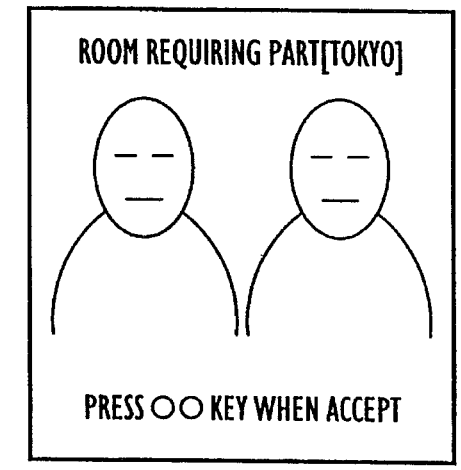

ROOM REQUIRING PART[TOKYO]

PRESS ○○ KEY WHEN ACCEPT

FIG. 7D

```
[ SELECTION PART-ROOM ]

AOMORI AKITA TOKYO YOKOHAMA
KYOTO NAGOYA KOBE KAGOSHIMA
OKINAWA

PRESS ○○ KEY BY MOVING
CURSOR
```

FIG. 7E

MULTIPOINT TELEVISION CONFERENCE SYSTEM WITH A MULTIPOINT CONTROL UNIT FOR REGISTERING INFORMATION ABOUT TV CONFERENCE ROOMS AND ROOM GROUPS AND ALLOWING A SELECTED ROOM TO PARTICIPATE IN THE TV CONFERENCE BASED ON REGISTERED INFORMATION

BACKGROUND OF THE INVENTION

1. Field of the Invention

The present invention relates to a multipoint television conference system for a television conference held among television conference rooms by using a multipoint control unit connected with the television conference rooms through a communication network. In particular, the present invention relates to the multipoint television conference system operating in case where a television conference room intends to intermediately participate in the television conference having been held.

2. Description of the Related Art

The multipoint television (TV) conference system is used in the business world. The system is composed of a plurality of TV conference terminals, which will be called "CTs" hereinafter, and a multipoint control unit, which will be called "MCU" hereinafter, connected with the CTs through a communication network such as a telephone network. The MCU is provided to the system for smoothly carrying out the TV conference among TV conference rooms. The CT is placed in the TV conference room and consists of an operation unit for performing operation concerning with the progress of the TV conference through the MCU, image input-output means and voice input-output means. The image input-output means includes a TV camera for picking up an image of persons (participants of the TV conference) and/or conference material such as documents in the TV conference room and a TV monitor for displaying the same in other TV conference rooms. The voice input-output means includes microphones for picking up voice of the persons in the TV conference room and a speaker for producing voice of other persons in other TV conference rooms.

By virtue of applying the multipoint TV conference system to the TV conference, the process of handling voice and image signals of the system has been developed. For example, by virtue of the MCU, voice signals produced from the TV conference rooms are mixed and sent to the TV conference rooms expect a voice signal produced from the TV conference room of the talker and an image signal produced from a TV conference room of a talker is distributed to other conference rooms of listeners and image signals of listeners in other conference rooms are selected to an image signal of a designated lister by the talker, so that the selected image signal is sent to the TV conference room of the talker.

In order to hold a TV conference, there have been two ways in the multipoint TV conference system. One is a way of calling the TV conference rooms prearranged to participate in the TV conference through the MCU. The TV conference rooms prearranged to participate in the TV conference will be called "TV conference rooms prearranged for participation" hereinafter. In this case, a promoter of the TV conference makes connection among the TV conference room prearranged for participation by telephone calling through the MCU. The other is a way of making the MCU select the TV conference rooms prearranged for participation from the TV conference rooms registered in the MCU and call the TV conference rooms prearranged for participation. In this case, the names of the TV conference rooms are previously registered in the MCU, and the names of the TV conference rooms prearranged for participation can be selected from the previously registered names. When all TV conference rooms prearranged for participation replay to the call and make connection with the MCU respectively, the TV conference can be held. The TV conference rooms which participate in the TV conference will be called "TV conference participating rooms" hereinafter.

The holding circumstance of TV conferences in the multipoint TV conference system is made known to all TV conference rooms in the system by the MCU. The MCU reads the names of the TV conference participating rooms from the register and writes the names into memories of the CTs in all TV conference participating rooms. Therefore, a TV conference room requires to intermediately participate in the TV conference, which will be called "TV conference room requiring intermediate participation" of "TV conference room requiring the intermediate participation" hereinafter, can participates in the TV conference after investigating the names registered in the CT. Meanwhile, when a TV conference participating room intermediately leaves the TV conference, the leaving can be performed by removing the name from the register by operating the CT. As a matter of course, the names rewritten thus in the register are informed to the CTs in all TV conference rooms by the MCU. This system has been disclosed in Japanese Laid-Open Patent Application TOKKAI HEI 4-290361 in 1992.

However, the above prior art multipoint TV conference system has problems. That is, a lot of operation are required to the CTs in the TV conference rooms for holding the TV conference and participating in the TV conference. Usually the TV conference rooms are separated to a plurality of TV conference groups, so that each TV conference room has to select a group and memory the name of the group. Further more, even though the names of the TV conference participating rooms are informed to the TV conference rooms for confirmation, there is no information on a TV conference room not participating in the TV conference and a TV conference room intermediately participate in the TV conference. In particular, regarding the intermediate participation, the TV conference participating rooms are impossible to deny the intermediate participation.

SUMMARY OF THE INVENTION

Therefore, in the present invention on the multipoint TV conference system for holding television conferences among television conference rooms by using a multipoint control unit connected with the television conference rooms through a communication network has the following objects.

An object of the present invention is to increase facility of the multipoint TV conference system.

Another object of the present invention is to increase security of the multipoint TV conference system in use.

Still another object of the present invention is to increase the reliability of the multipoint TV conference system in use.

The above objects are accomplished by providing the register and the control unit in the multipoint control unit and the operation unit in the TV conference rooms.

The register provides registering regions for registering the names, the seats and the telephone calling numbers of the TV conference rooms connected with the multipoint control unit, and for registering the names of groups formed in the TV conference rooms for holding the TV conferences and marks indicating the promoters of the TV conferences holding in the groups, the TV conference rooms selected by the promoters for holding the TV conferences and the TV conference rooms not responding to the calling from the multipoint control unit.

The control unit is provided to perform the following process in the multipoint TV conference system.

A case of holding the TV conference will be described. Corresponding to the telephone call from a TV conference room requiring to hold the TV conference, the control unit reads the names of the TV conference rooms not participating in any TV conference, from the register, and the control unit transmits the read names to the TV conference room requiring to hold the TV conference.

When the TV conference room requiring to hold the TV conference determines the names of the TV conference rooms requiring to participate in the TV conference and transmits the determined names to the multipoint control unit, the control unit receives the determined names, reads the group name corresponding to the received names from the register and transmits the read group name to the TV conference rooms requiring to participate in the TV conference.

In regard to the above description, the control unit has call means for calling the TV conference rooms requiring to participate in the TV conference by reading the telephone calling numbers from the register and connection means for connecting among the TV conference rooms responding to the calls from the call means.

Further, the control unit has stop calling means for stopping telephone calling performed to TV conference rooms not responding to the calls from the call means, after calling repeatedly a designated number of times, and for informing the room names of the TV conference rooms not responding to the calls, to the TV conference rooms responding the calls.

When a TV conference room requires to intermediately participate in a TV conference, the control unit has transmission means for transmitting, to the TV conference rooms under holding the TV conference, information on the TV conference room requiring the intermediate participation and instructions for sending results of judging whether the intermediate participation is accepted, to the multipoint control unit. Furthermore, the control unit has prohibition means for prohibiting the TV conference room requiring the intermediate participation from observing images of the TV conference rooms under holding the TV conference and listening voice in the TV conference rooms under holding the TV conference, until the intermediate participation is accepted by the TV conference rooms under holding the TV conference. Still further, the control unit has judgement means for judging whether the intermediate participation is accepted on the basis of judging criteria predetermined in consideration of unanimous agreement, agreement of the promoter of the TV conference, decision by majority and decision by absolute right of denial given to a designated TV conference room under holding the TV conference, and for transmitting results of the judgement to the TV conference room requiring the intermediate participation.

The operation unit provided in the TV conference rooms respectively performs operation matter such as the requirement of holding the TV conference, the selection of the names of the TV conference rooms, the requirement of the intermediate participation in the TV conference and the judgement on the acceptance of the intermediate participation, by observing the images sent from the TV conference rooms through the multipoint control unit.

Providing the register and the control unit in the multipoint control unit and the operation unit in the TV conference rooms thus, the process for starting the TV conference, selecting the TV conference rooms and judging the intermediate participation can be performed conveniently, at high speed, in high security and in high reliability.

BRIEF DESCRIPTION OF THE DRAWINGS

FIG. 3 is a table for illustrating the matter registered in the memory regions provided to the register of the multipoint control unit in the multipoint TV conference system;

FIG. 7 A is a picture showing an example of the display on the TV monitor 22 at step B 4 depicted in FIG. 4;

FIG. 7 B is a picture showing an example of the display on the TV monitor 22 at step B 7 depicted in FIG. 4;

FIG. 7 C is a picture showing an example of the display on the TV monitor 22, related to step A 22 depicted in FIG. 6;

FIG. 7 D is a picture showing an example of the display on the TV monitor 22, related to step A 22 depicted in FIG. 6; and FIG. 7 E is a picture showing an example of the display on the TV monitor 22, related to step B 9 depicted in FIG. 5.

DESCRIPTION OF THE PREFERRED EMBODIMENT

The preferred embodiment of the present invention will be described with reference to FIGS. 1 to 7.

Figure 1:
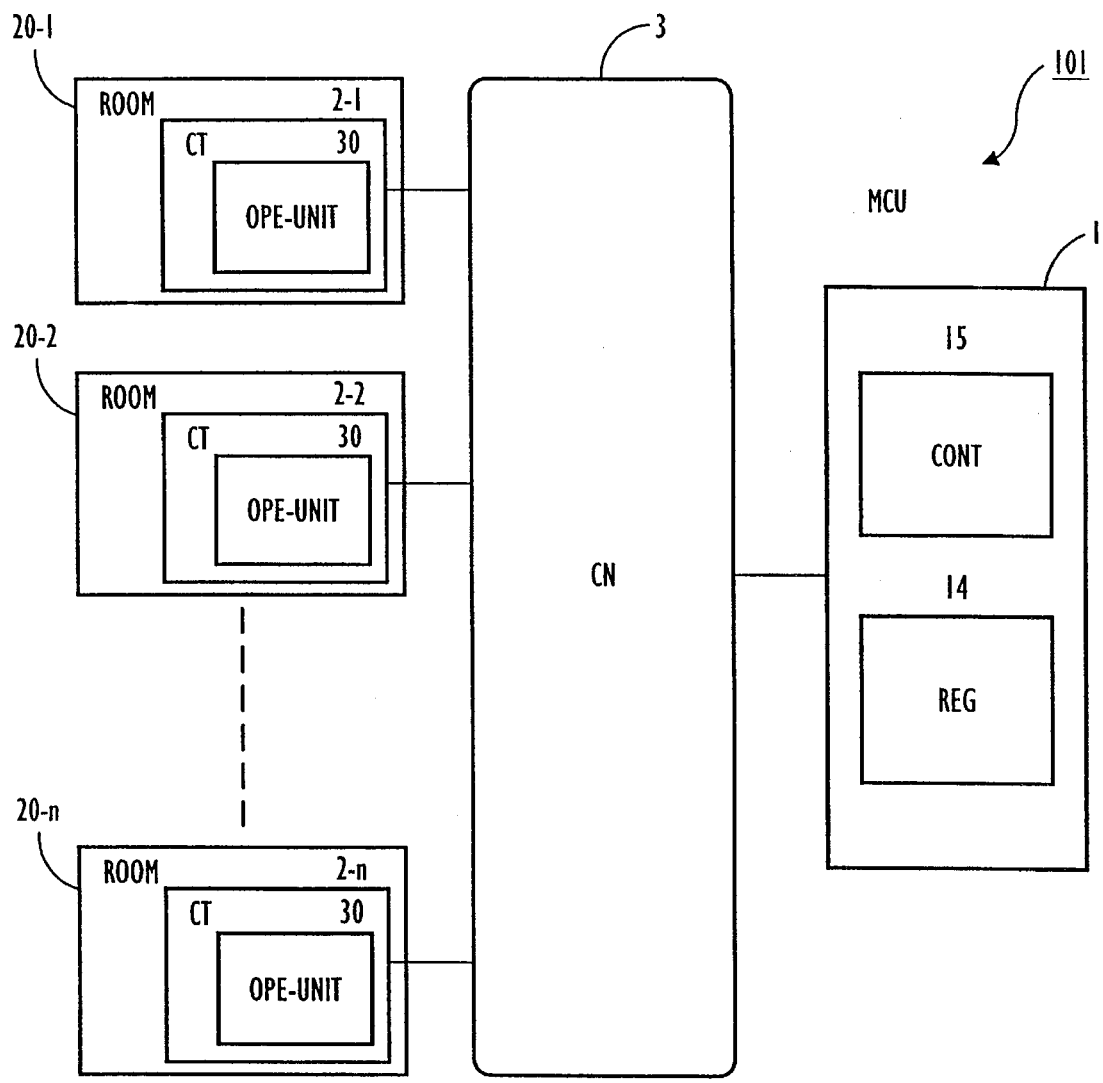
FIG. 1 is a block diagram of the multipoint TV conference system for illustrating the principle of the present invention.

FIG. 1 is a block diagram of a multipoint TV conference system (101), for illustrating the principle of the present invention. The multipoint TV conference system 101 consists of a plurality of TV conference terminals, which have been abbreviated as "CTs", (2-1, 2-2, - - - and 2-n) placed at TV conference rooms (ROOMs) (20-1, 20-2, - - - and 20-n) respectively and a multipoint conference unit (1), which has been abbreviated to "MCU", connected with CTs 12-1 to 12-n through a communication network (CN) (13) such as the public or private telephone network.

The MCU 1 includes a memory or register (REG) (14) and a controller (CONT) (15). The names of ROOMs 20-1, 20-2, - - - and 20-n and groups of TV conference are registered in REG 14. The TV conference rooms are usually separated to a plurality of groups for TV conferences so that a group includes four to eight TV conference rooms which participate in a TV conference. The names of the groups are registered in REG 14 before the TV conference is held.

When a TV conference is intended to be held, CONT 15 sends the names of the TV conference rooms not participating in any TV conference, to a TV conference room which requires to hold a TV conference which will be called "TV conference room requiring to hold TV conference" hereinafter. When a TV conference room requires to participate in a TV conference intermediately, CONT 15 sends the name of the group for the TV conference, to the TV conference room requiring intermediate participation. The holding requirement of a TV conference and the intermediate participation requirement in a TV conference are performed by using an operation unit (OPE-UNIT) (30) provided to the CT in respective TV conference room.

In case of intending to hold a TV conference, using OPE-UNIT 30, the TV conference room requiring to hold TV conference selects room names from the room names registered in REG 14 and sends the selected names to MCU 1. In case of the intermediate participation requirement, using OPE-UNIT 30, the TV conference room requiring intermediate participation selects a group of TV conference from the group names registered in REG 14 and sends the selected group name to MCU 1.

The names and calling numbers of all TV conference rooms are previously registered in REG 14. However, these names and calling numbers can be increased, decreased or changed as necessary. The REG 14 has a backup region in which, for example, a promoter mark for indicating a promoter of a TV conference is registered. Searching the promoter mark, the TV conference rooms can easily find out the TV conference room of the promoter. This may be convenient for the TV conference room requiring intermediate participation.

The CONT 15 reads the names of TV conference rooms not participating in any TV conference from REG 14 in response to the holding requirement from the TV conference room requiring to hold TV conference and sends the read names to the TV conference room requiring to hold TV conference. The read names are displayed at the TV conference room requiring to hold TV conference. Then, the OPE-UNIT 30 of the CT in the TV conference room requiring to hold TV conference (for example, the OPE-UNIT 30 of CT 2-1 in ROOM 20-1 in FIG. 1) selects designated names from the displayed names and sends the designated names to MCU 1. Receiving the designated names, MCU 1 registers the designated names into REG 14 through CONT 15. The MCU 1 reads the calling numbers of the designated names from REG 14 and calls the TV conference rooms of the designated names. Then, MCU 1 forms a TV conference group by connecting TV conference rooms which accept the calling. After forming the TV conference group, CONT 15 registers the group name in REG 14, corresponding to the TV conference rooms which accept the calling.

When there is no reply from the TV conference room having the designated number even though CONT 15 calls repeatedly, CONT 15 stops the calling and informs the names of the no-replay TV conference room to the TV conference rooms in the group. This is for always making the participation circumstances of the TV conference clear to the TV conference rooms of the group.

When a TV conference room requires to intermediately participate in the TV conference, the TV conference room requiring the intermediate participation sends information on the name, calling number and image signal of the TV conference room requiring the intermediate participation to MCU 1. Receiving the information on the TV conference room requiring the intermediate participation, CONT 15 sends the information to the TV conference rooms of the group. At the same time, CONT 15 sends a signal of asking whether the intermediate participation is accepted, to the TV conference rooms of the group. Receiving the asking signal from MCU 1, the TV conference rooms of the group send replying signals to MCU 1 by operating OPE-UNITs 30 of the CTs in the TV conference rooms of the group. By virtue of this system, it can prevent from occurring that a TV conference room not belonging to the group intermediately participate in the TV conference without permission of the group.

Further more, CONT 15 controls so that the image and voice signals produced at the TV conference rooms of the group are not sent to the TV conference room requiring the intermediate participation unless the intermediate participation is accepted by the group. By virtue of this system, it can avoid occurring that the image and voice from the TV conference rooms of the group are observed and listened at the TV conference room requiring the intermediate participation without acceptance of the group.

The CONT 15 judges whether the intermediate participation is accepted, in accordance with directions from the TV conference rooms of the group. The judgement can be made in compliance with criteria previously established for cases where the intermediate participation is accepted by unanimous agreement, agreement due to the TV conference's promoter, majority agreement and agreement due to absolute right of denial given to a designated TV conference room of the group. After judgement, CONT 15 informs the results of the judgement to the TV conference room requiring the intermediate participation. If the intermediate participation is accepted, CONT 15 makes connection between the TV conference room requiring the intermediate participation and the TV conference rooms of the group respectively, and if the intermediate participation is not accepted, CONT 15 makes disconnection between the TV conference room requiring the intermediate participation and the TV conference rooms of the group.

Figure 2:
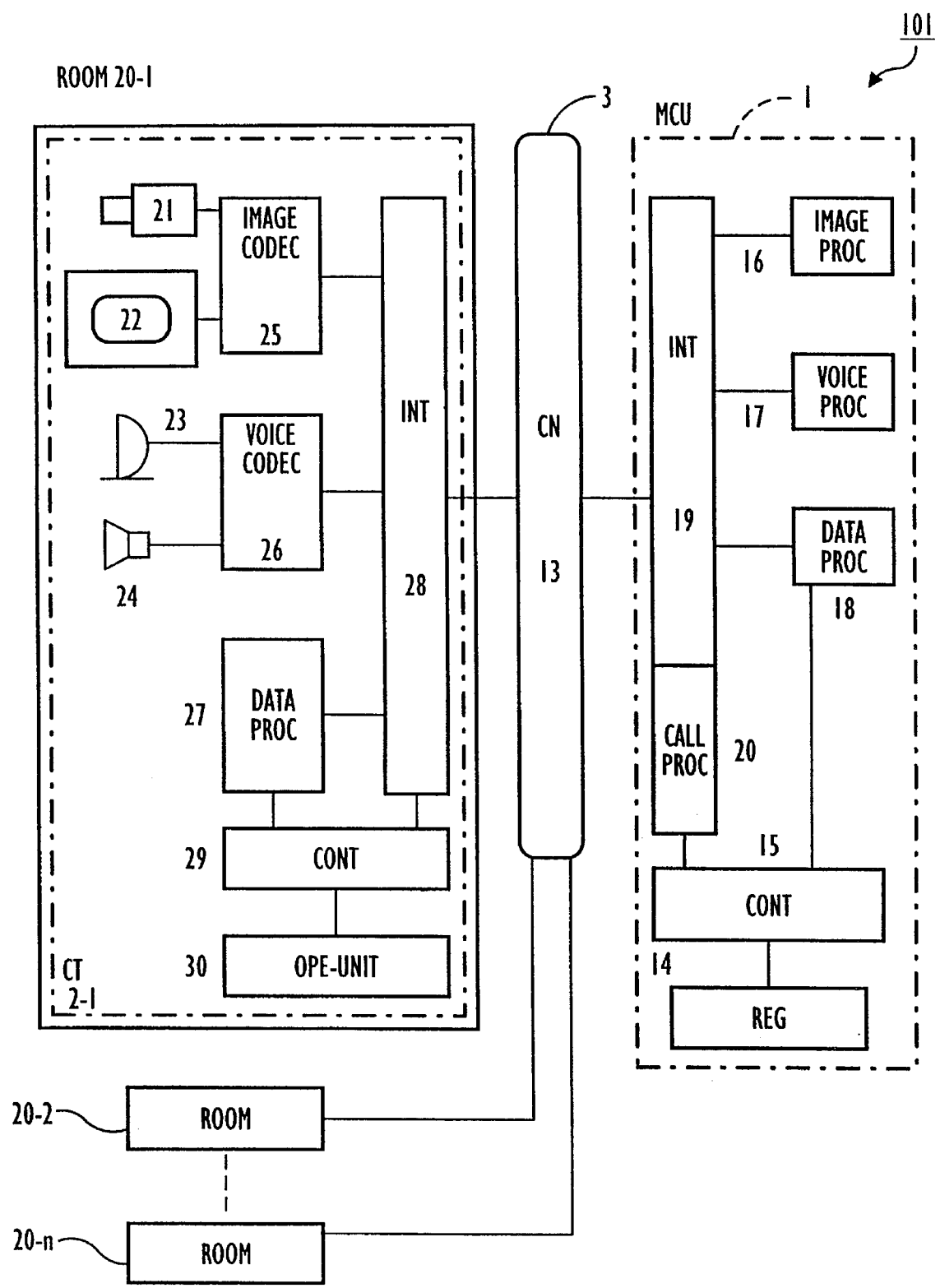
FIG. 2 is a block diagram of the multipoint TV conference system for illustrating the preferred embodiment of the present invention.

FIG. 2 is a block diagram of the multipoint TV conference system 101, for illustrating the preferred embodiment of the present invention. In FIG. 2, the same reference numeral designates the same unit as in FIG. 1. As described in reference with FIG. 1, the system 101 consists of MCU 1 and a plurality of CTs 2-1 to 2-n respectively provided in ROOMs 20-1 to 20-n connected with MCU 1 through CN 3. Taking CT 2-1 as an example of the control terminal, the system 101 will be described in reference with FIG. 2.

The CT 2-1 consists of the following units: an image code and decoder (IMAGE CODEC) (25) for coding an image signal produced from a TV camera (21) so as to send to other CTs through CN 3 and MCU 1 and decoding an image signal sent from other CTs through CN 3 and MCU 1 so as to send to a TV monitor (22); a voice decoder (VOICE DECODER) (26) for coding a voice signal produced by a microphone (23) so as to send to other CTs through CN 3 and MCU 1 and decoding a voice signal sent from other CTs through CN 3 and MCU 1 so as to send to a speaker (23); the OPE-UNIT 30 having function described in reference with FIG. 1 and operated by using a mouse or a key board; a control unit (CONT) (29) for controling signals concerned with OPE-UNIT 30, IMAGE CODEC 25, VOICE CODEC 26 and MCU 1; a line interface (INT) (28) having interface function concerned with signals transfered between CT 2-1 and CN 3; and a low speed data processor (DATA PROC) (27) for processing data and signals concerned with INT 28 and CONT 29.

The MCU 1 consists of the following units: REG 14 made of a semiconductor memory or a magnetic disc memory and circuits associated with the memory, having function which will be described in the process performed in the multipoint TV conference system 101; CONT 15 consisting of a computer and process circuits associated with the computer, having function which will be described in the process performed in the system 101; an image processor (IMAGE PROC) (16) for distributing an image signal received from a TV conference room to other TV conference rooms or distributing an image signal from a TV conference room in response to the requirement from another TV conference room; a voice processor (VOICE PROC) (17) for distributing and mixing the voice signals of the TV conference rooms the same as a voice processor of the well known telephone conference system; a line interface (INT) (19) having the same function as INT 28 in CT 2-1; a call processor (CALL PROC) (20) for calling the TV conference rooms, complying with the instructions from the TV conference rooms of the group; and a low speed data processor (DATA PROC) (18) for processing data and signals concerned with INT 19 and CONT 15.

The REG 14 has memory regions. FIG. 3 illustrates an example of the memory regions of REG 14, in which room names and matter associated with the rooms are registered. That is, in REG 14, there are memory regions for registering room names (ROOM NAMEs), calling numbers (CALLING NUMBERs), seats (SEATs) and group names (GROUP NAMEs), and there are columns M, S and E. The letter M indicates the promoter or master of the TV conference, the letter S indicates a selected TV conference room and the letter S indicates a TV conference room giving no response to MCU 1. The numeral I and II in column GROUP NAME indicate group numbers. FIG. 3 shows an example of data registered in the memory regions. In FIG. 3, TV conference rooms SAPPORO, SENDAI, OSAKA, HIROSHIMA and FUKUOKA are under holding a TV conference of group I and the promoter room of the TV conference of group I is OSAKA, and TV conference rooms YOKOHAMA, KOBE and KAGOSHIMA are under holding a TV conference of group II and the promoter room of the TV conference of group II is YOKOHANA.

Figure 4:
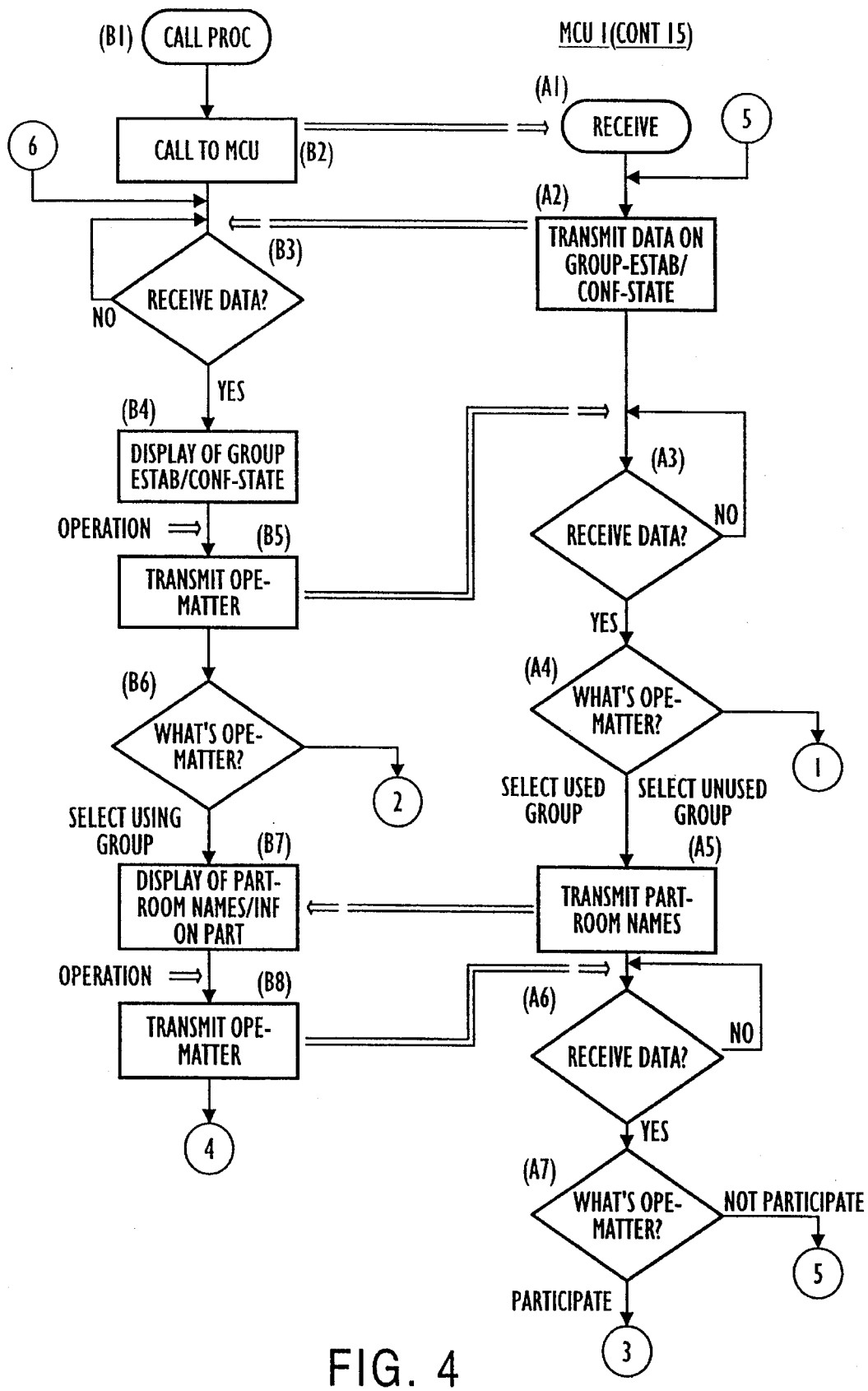
FIG. 4 is a flow chart for illustrating the flow of the process advanced in the multipoint TV conference system.
Figure 5:
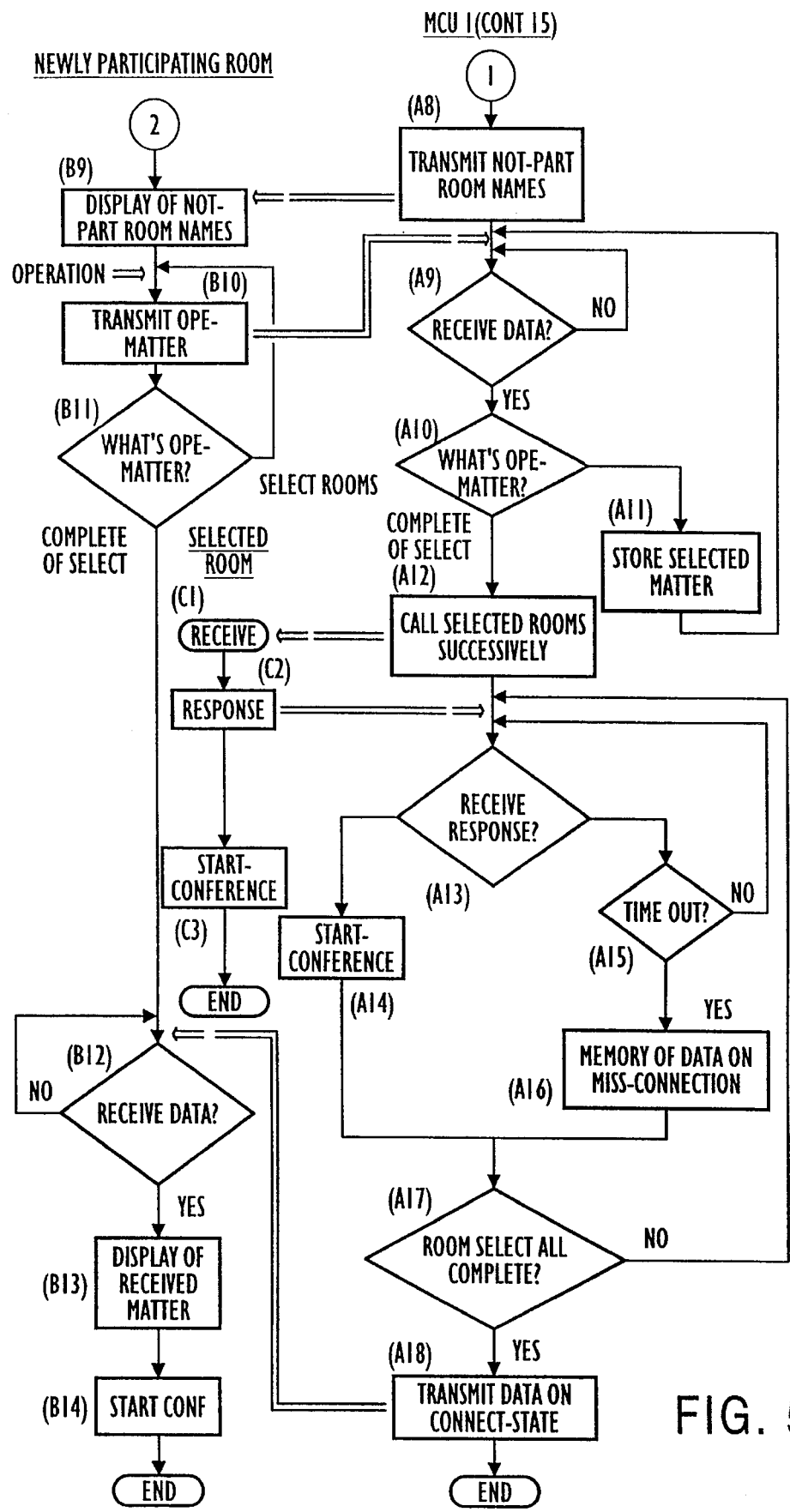
FIG. 5 is a flow chart continued from the flow chart in FIG. 4.
Figure 6:
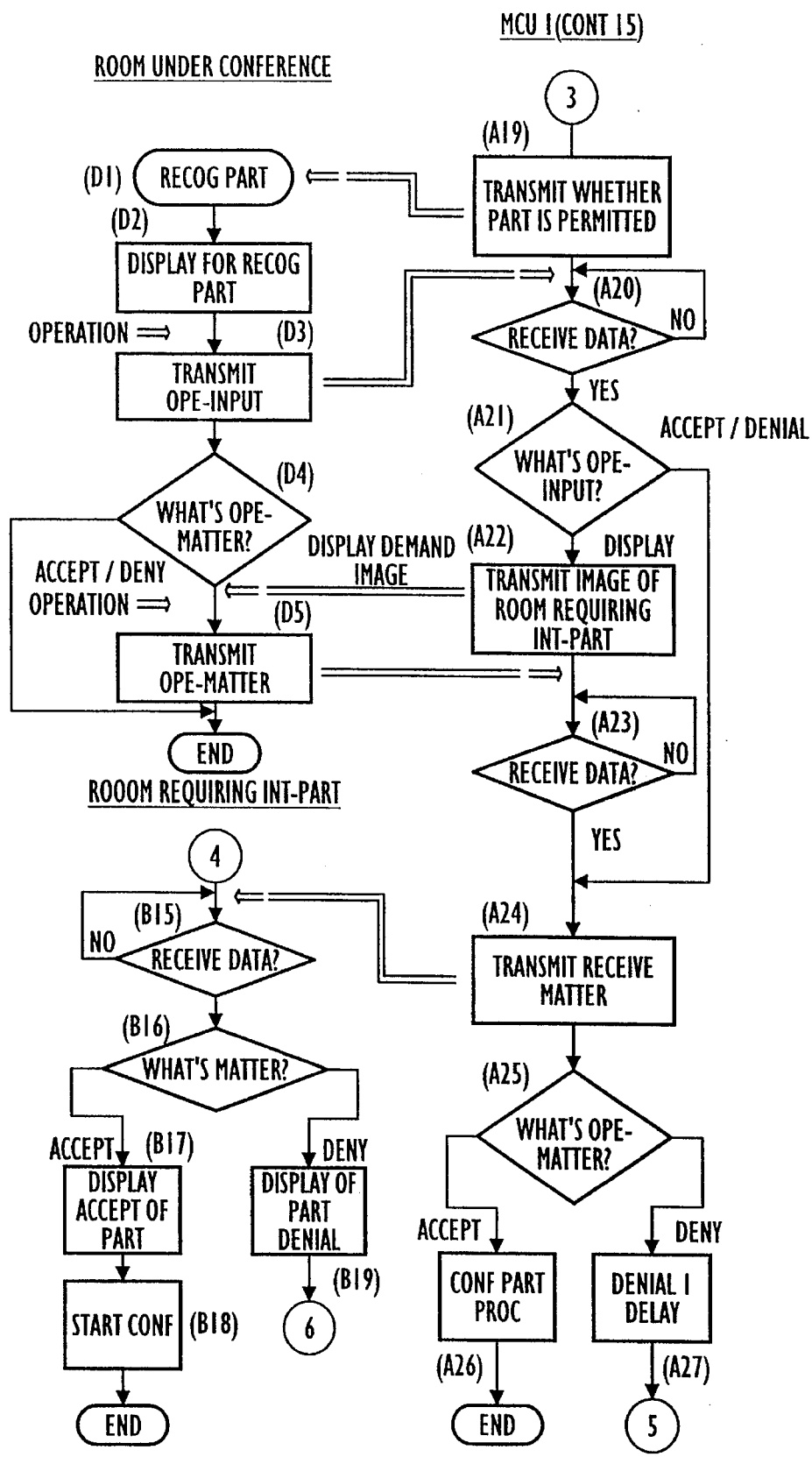
FIG. 6 is a flow chart continued from and continuing to the flow chart in FIG. 4.

FIGS. 4, 5 and 6 are flow charts for describing flow of the process carried out in the multipoint TV conference system 101. The TV conference room intending to newly participate in a TV conference, which will be called "newly participating room" (NEWLY PARTICIPATING ROOM) hereinafter, corresponds to the "TV conference room requiring to hold TV conference" or the "TV conference room requiring intermediate participation".

In FIG. 4, in order to hold a TV conference, the NEWLY PARTICIPATING ROOM calls MCU 1 (step B 2) through calling process (CALL PROC) by operating CONT-UNIT 30 of the CT in the NEWLY PARTICIPATING ROOM (step B 1). In the above, MCU 1 is actually CONT 15 in the description on the flow charts shown in FIGS. 4 to 6, so that letter MCU 1 (CONT 15) is depicted in FIGS. 4 to 6 respectively. When MCU 1 receives the call from the NEWLY PARTICIPATING ROOM, by virtue of receiving process (RECEIVE) (A 1), MCU 1 reads data on the establishment of group and the state of conference from REG 14 and transmits them to the NEWLY PARTICIPATING ROOM (TRANSMIT DATA ON GROUP-ESTAB/CONF-STATE) (A 2). In the NEWLY PARTICIPATING ROOM, after confirming the reception of the data from MCU 1 (RECEIVE DATA?) (B 3), the data is displayed on the TV monitor 22 (DISPLAY OF GROUP ESTAB/CONF STATE) (B 4).

FIGS. 7 A, 7 B, 7 C, 7 D and 7 E illustrate examples of the display on TV monitor 22. FIG. 7 A shows an example of the display on the TV monitor 22 at step B 4. In FIG. 7 A, GROUP I holds a TV conference in ROOM 5, GROUPs II and V hold another TV conference in ROOM 3 and GROUPs III and IV are in an unused state (UNUSED) of TV conference. Observing the display shown in FIG. 7 A, the NEWLY PARTICIPATING ROOM selects a group as follows: when the NEWLY PARTICIPATING ROOM is "the TV conference room requiring to hold TV conference", the NEWLY PARTICIPATING ROOM selects GROUP III or IV which are in the UNUSED state; and when NEWLY PARTICIPATING ROOM is "the TV conference room requiring intermediate participation", NEWLY PARTICIPATING ROOM selects one of GROUPs I, II and V. In FIG. 7 A, a thick line frame surrounding GROUP I indicates that NEWLY PARTICIPATING ROOM selects GROUP I in case of "the TV conference room requiring intermediate participation".

The GROUP is selected at the NEWLY PARTICIPATING ROOM by operating OPE-UNIT 30, from information displayed on the TV monitor 22 and sends matter selected in operation (OPE-MATTER) to MCU 1 (TRANSMIT OPE-MATTER) (B 5). The OPE-MATTER is "GROUP I" in case of FIG. 7 A. Then, judgement on whether the selected GROUP is UNUSED is performed in the NEWLY PARTICIPATING ROOM (WHAT'S OPE-MATTER) (B 6). At step B 6, if a using GROUP such as GROUP I in FIG. 7 A is selected, the process is advanced to step B 7, and if an UNUSED GROUP is selected, the process is advanced to step B 9 in FIG. 5.

In MCU 1, judgement on whether data (OPE-MATTER) is received is performed (RECEIVE DATA?) (A 3). When MCU 1 receives the data (YES), judgement on whether the operation matter is "using GROUP" or "UNUSED GROUP" is performed (WHAT'S OPE-MATTER?) (A 4). When UNUSED GROUP is selected, the process is advanced to step A 8 in FIG. 5, which is the case where the NEWLY PARTICIPATING ROOM is the TV conference room requiring to hold TV conference. When "using GROUP" is selected, the room names of the group and the group name are transmitted to the NEWLY PARTICIPATING ROOM after reading REG 14 (TRANSMIT PART-ROOM NAMES) (A 5), which is the case where the NEWLY PARTICIPATING ROOM is the TV conference room requiring intermediate participation.

In NEWLY PARTICIPATING ROOM, when it is judged at step B 6 that the using GROUP is selected, the participating room names (PART-ROOM NAMES) sent from MCU 1 are displayed on TV monitor 22 and the determination of whether NEWLY PARTICIPATING ROOM participates in the selected GROUP is performed by operating OPE-UNIT 30 and observing the display of TV monitor 22 (DISPLAY OF PART-ROOM NAMES/INF ON PART) (B 7). The matter of operation is transmitted to MCU 1 (TRANSMIT OPE-MATTER) (B 8).

For instance, when GROUP I is selected as shown in FIG. 7 A, MCU 1 transmits TV conference names, SAPPORO, SENDAI, OSAKA and FUKUOKA, after reading REG 14. Because, the TV conference rooms having these ROOM NAMES belongs to GROUP I as shown in FIG. 3. Therefore, in the NEWLY PARTICIPATING ROOM, a picture shown in FIG. 7 B is displayed on TV monitor 22 at step B 7. At this time, since PARTICIPATE and NOT PARTICIPATE are displayed in the picture, the NEWLY PARTICIPATING ROOM determines either one of them. FIG. 7 B show a case where PARTICIPATE is selected by operating OPE-UNIT 30.

In MCU 1, after judging whether the OPE-MATTER is received from step 8 (RECEIVE DATA?) (A 6), judgement on whether the data is participation (PARTICIPATE) or no participation (NOT PARTICIPATE) is performed (WHAT'S OPE-MATTER?) (A 7) when the OPE-MATTER is received at step A 6 (YES). When NOT PARTICIPATE is selected, the process returns to step A 2 for making the NEWLY PARTICIPATING ROOM select another GROUP. When PARTICIPATE is selected, the process is advanced to step A 19 in FIG. 6.

At step A 4, when the OPE-MATTER is "an unused group (UNUSED GROUP)", the OPE-MATTER teaches that the NEWLY PARTICIPATING ROOM is the "TV conference room requiring to hold TV conference", so that the process is advanced to step A 8 in FIG. 5. In FIG. 5, MCU 1 reads the names of TV conference rooms not participating in any group from REG 14 and transmits the read names to the NEWLY PARTICIPATING ROOM (TRANSMIT NOT-PART ROOM NAMES) (A 8). Wherein, the read names is called NOT-PART ROOM NAMES in FIG. 5. In the NEWLY PARTICIPATING ROOM, after receiving the NOT-PART ROOM NAMES from MCU 1, the NOT-PART ROOM NAMES are displayed on TV monitor 22 (DISPLAY OF NOT-PART ROOM NAMES) (B 9).

Observing the display at step B 9 and operating OPE-UNIT 30, the names of TV conference rooms for holding the TV conference are selected and the selected room names is transmitted to MCU 1 (TRANSMIT OPE-MATTER) (B 10). After judging whether the selection of the TV conference rooms is completed (WHAT'S OPE-MATTER?) (B 11), the process returns to step B 10 when the selection is not completed and the process is advanced to step B 12 when the selection is completed. At step B 10, there are two ways to transmit the selected room names to MCU 1. One is to transmit the selected names every time one room is selected and to transmit information on the completion of the room name selection to MCU 1 after the room name selection is completed. The other is to transmit information on the completion of the room name selection to MCU 1 after the room name selection is completed.

For instance, FIG. 7 (E) shows display of the TV conference rooms not participating in any group at step B 9, and the display shows a case where before the TV conference of group II is held, YOKOHAMA is selected after KOBE has been selected. In FIG. 7 (E), when the NEWLY PARTICIPATING ROOM selects KAGOSHIMA next and decides that a group of the TV conference is GROUP II, the selected loom names (YOKOHAMA, KOBE and KAGOSHIMA) are informed to MCU 1. Then, MCU 1 calls the selected TV conference rooms respectively. When the selected TV conference rooms respond to the calls, the TV conference of GROUP II is formed as shown in FIG. 3. If it is determined that YOKOHAMA is the TV conference room of the promoter, the flag "M" is established at YOKOHAMA column as shown in FIG. 3.

Next, MCU 1 judges whether data is received from NEWLY PARTICIPATING ROOM (RECEIVE DATA?) (A 9). When the data is received, MCU 1 judges whether the name selection is continued or completed (WHAT'S OPE-MATTER?) (A 10). When the name selection is continued, the selecting names are continued to be stored in a memory provided in MCU 1 (STORE SELECTING NAMES) (A 11). When the name selection is completed, MCU 1 calls the selected TV conference rooms successively (CALLS SELECTED ROOMS SUCCESSIVELY) (A 12). This has been briefly described above.

When the newly selected conference room (SELECTED ROOM) receives the call from MCU 1 (RECEIVE) (C 1) and responds to MCU 1 for acceptance of the call (RESPONSE) (C 2), the TV conference becomes ready to start the TV conference (START CONFERENCE) (C 3). Judging whether there is the response to the call (RECEIVE RESPONSE?) (A 13), the MCU 1 performs the process of the participation of the TV conference, such as image distribution performed at IMAGE PROC 16 and voice distribution and mixing performed at VOICE PROC 17 (START CONFERENCE) (A 14). When there is no reply to the call, MCU 1 judges whether it is time out (TIME OUT?) (A 15) and stores data on misconnection in a memory provided in MCU 1 (MEMORY OF DATA ON MISCONNECTION) (A 16).

When the misconnection occurs, the call can be repeated a designated number of times. When there is no replay to the call though the call is repeated proper number of times, it is judged that the power of the TV conference room is not turned on or some trouble occurs in the TV conference room. The MCU 1 Judges whether the process for the response from the TV conference room is all completed (ROOM SELECT ALL COMPLETE?) (A 17). When the responses are completely received from the NEWLY PARTICIPATING ROOMS (the selected TV rooms), MCU 1 transmits data on the connection state of the TV conference rooms (TRANSMIT DATA ON CONNECT-STATE) (A 18).

Next, judging whether data is received from MCU 1 (RECEIVE DATA?) (B 12), the received matter is displayed on TV monitor 22 in the NEWLY PARTICIPATING ROOMS (DISPLAY OF RECEIVED MATTER) (B 13). Investigating the display obtained at step B 13, the NEWLY PARTICIPATING ROOM confirms that most of the selected rooms participate in the TV conference, responding to the calls from MCU 1, however, some selected rooms are in an not-participating state, not responding to the calls from MCU 1. When the responses are all confirmed, the TV conference starts to hold (START CONFERENCE) (B 14).

The names of the selected TV conference rooms, the TV conference rooms responding to the calls from MCU 1 and the TV conference rooms not responding to the calls from MCU 1 are registered in REG 14 as shown in FIG. 3. At this time, flags are established in columns "M", "S" and "E" at need. When the TV conference is terminated, the flags are reset.

When NEWLY PARTICIPATING ROOM is a TV conference room requiring intermediate participation, the process is advanced as follows.

When NEWLY PARTICIPATING ROOM (a TV conference room requiring intermediate participation) intends to intermediately participate in a TV conference, the ROOM selects a group name from the group names previously given. The first step of the selection is the observation of the TV monitor 22 at steps B 4 and B 7 as described in reference with FIG. 4, 7 A and 7 B. Incidentally, FIG. 7 A shows an example of the display at step B 4, and FIG. 7 B shows that at step B 7.

In order to select the group name, a group which is under holding a TV conference is selected from the display at step B 4.

For instance, GROUP II is selected from the display shown in FIG. 7 A. When GROUP II is selected, the ROOMs participating in GROUP II are read out from REG 14, so that ROOM NAMEs of YOKOHAMA, KOBE and KAGOSHIMA (see FIG. 3) are displayed. The display is the same as that in FIG. 7 B except YOKOHAMA, KOBE and KAGOSHIMA are displayed instead of SAPPORO, SENDAI, OSAKA, HIROSHIMA and FUKUOKA. When PAR- TICIPATE in FIG. 7 B is selected, MCU 1 judges that the OPE-MATTER is PARTICIPATION at step A 7 shown in FIG. 4.

As a result, the process is advanced to step A 19 (TRANSMIT WHETHER PART IS PERMITTED) in FIG. 6. At step A 19, reading REG 14, MCU 1 transmits information on the TV conference room requiring intermediate participation such as ROOM NAME and SEAT and confirmation on whether the intermediate participation, to the TV conference rooms in GROUP II (RECOG PART) (D 1). Each of the TV conference rooms in GROUP II is a TV conference room under holding a TV conference (ROOM UNDER CONFERENCE). The letter "ROOM UNDER CONFERENCE" is depicted in FIG. 6.

In the ROOM UNDER CONFERENCE, the matter of the confirmation is displayed (DISPLAY OF CONF-MATTER) (D 2). Observing the display and operating OPE-UNIT 30, ROOM UNDER CONFERENCE transmits the matter of operation (OPE-MATTER) to MCU 1 (TRANSMIT OPE-MATTER) (D 3). Wherein, the OPE-MATTER includes information on whether the intermediate participation is accepted or denied (ACCEPT/DENIAL) and a demand of sending the image of the TV conference room requiring intermediate participation if needed (DEMAND IMAGE).

Therefore, the ROOM UNDER CONFERENCE decides which way the ROOM UNDER CONFERENCE takes, a way of ACCEPT/DENIAL or a way of DEMAND IMAGE (WHAT'S OPE-MATTER?) (D 4). If the way of ACCEPT/DENIAL is taken, the process is advanced to END. If the way of DEMAND IMAGE is taken, the ROOM UNDER CONFERENCE judges whether the intermediate participation is accepted or denied by observing the image of the TV conference room requiring intermediate participation sent from MCU 1. The judgement is performed by operating OPE-UNIT 30. If the intermediate participation is denied, the process is advanced to END. When the intermediate participation is accepted, the information on the acceptance (OPE-MATTER) is transmitted to MCU 1 by operating OPE-UNIT 30 (TRANSMIT OPE-MATTER) (D 5).

Meanwhile, MCU 1 judges whether the data (OPE-MATTER) obtained at step D 3 is received (RECEIVE DATA?) (A 20). When the data is received, MCU 1 judges whether the OPE-MATTER is ACCEPT/DENIAL or DEMAND IMAGE (WHAT'S OPE-MATTER?) (A 21) and transmits the IMAGE of the TV conference room requiring intermediate participation to ROOM UNDER CONFERENCE when the OPE-MATTER is the DEMAND IMAGE (TRANSMIT IMAGE OF ROOM UNDER CONFE) (A 22). By virtue of the above process, the image of the TV conference room requiring intermediate participation can be observed at the ROOM UNDER CONFERENCE (TV conference rooms in GROUP II).

For instance, if the TV conference room TOKYO requires to intermediately participate in the TV conference of GROUP II, image and character information on the TV conference room TOKYO is displayed on the TV monitor 22 (as shown in FIG. 7 C in the TV conference rooms of group II respectively. In this case, there are two ways of the judgement on the acceptance of the intermediate participation. One way is making the judgement by only operating OPE-UNIT 30 at TV conference rooms in GROUP II respectively. The other way is making the judgement by observing the circumstances of the TV conference room requiring the intermediate participation such as persons in the room. The latter way is performed by requiring the image of the TV conference room requiring the intermediate participation. Corresponding to the demand of the IMAGE, the image, as shown in FIG. 7 D, of the TV conference room requiring intermediate participation is transmitted to the TV conference rooms in GROUP II through MCU 1 (TRANSMIT IMAGE OF ROOM REQUIRING INT-PART) (A 22).

The MCU 1 Judges whether data is received from ROOM UNDER CONFERENCE (RECEIVE DATA?) (A 23). When MCU 1 receives the data on the ACCEPT/DENIAL produced at step A 21, MCU 1 transmits received data on the ACCEPT/DENIAL information produced at step A 21 to the TV conference room requiring intermediate participation (ROOM REQUIRING INT-PART) (TRANSMIT RECEIVED-MATTER) (A 24). That is, MCU 1 sends information on the ACCEPT/DENIAL to the TV conference room requiring intermediate participation.

The ROOM REQUIRING INT-PART judges whether data is received from MCU 1 (RECEIVE DATA?) (B 15). When data is received, the ROOM REQUIRING INT-PART judges whether the intermediate participation is accepted or denied (WHAT'S MATTER?) (B 16). When the intermediate participation is accepted, the state of the acceptance is displayed (DISPLAY ACCEPT OF PART) (B 17) and the TV conference starts holding (START CONF) (B 18). When the intermediate participation is denied, the state of the denial is displayed (DISPLAY DENIAL OF PART) (B 19), and the process returns to step B 2 in FIG. 4.

Meanwhile, MCU 1 judges whether the OPE-MATTER sent from ROOM UNDER CONFERENCE is acceptance or denial of the intermediate participation (WHAT'S OPE-MATTER?) (A 25). When the intermediate participation is accepted, MCU 1 performs a participating process (CONF PART PROC) (A 26), and when the intermediate participation is denied, MCU 1 performs a denial process and the process is turned to step A 2 in FIG. 4 after performing a delay process (DENIAL/DELAY) (A 27).

In accordance with the OPE-MATTER sent from ROOM UNDER CONFERENCE to MCU 1, MCU 1 can perform final judgement on whether the requirement is accepted or denied in compliance with judging criteria previously established in consideration of unanimous agreement, majority agreement and absolute right of denial given to a designated ROOM UNDER CONFERENCE, for example the absolute right of a promoter of the designated ROOM UNDER CONFERENCE.

For instance, when unanimous agreement is employed, the intermediate participation is judged by the unanimous agreement of ROOMs UNDER CONFERENCE. The judging criteria are usually applied to the multipoint TV conference system. However, they can be applied to the groups individually.

It is prohibited until the process of advancing the intermediate participation is completed at step A 26 that information on the image of and the voice in the TV conference rooms under holding the TV conference is transmitted to the TV conference room requiring the intermediate participation. By virtue of the prohibition, it can be prevented that the circumstances of the TV conference are transpired to outside. Further, by virtue of displaying the image of the TV conference room requiring intermediate participation in the TV conference rooms under holding the TV conference, it is possible to judge whether the intermediate participation is accepted by observing circumstances of the TV conference room requiring intermediate participation.

Furthermore, when some rooms of the TV conference rooms under holding the TV conference leave from the TV conference, it is possible to control that the rooms cannot leave the TV conference unless other rooms admit the leaving. This control can be performed in the same process as for the intermediate participation. When the TV conference completes, usually TV conference rooms perform complete process of the participation, respectively. However, it is possible that CONT 15 makes the TV conference of the group complete, recognizing the completion at the TV conference room of the TV conference's promoter. Moreover, in REG 14, it is possible to arrange the ROOM NAMES every group. Still further, when the TV conference is very important, it is possible to use a secret code for the communication among the TV conference rooms under holding the TV conference.

What is claimed is:

1. A multipoint television conference system for holding television conferences among television conference rooms (20-1, 20-2, - - - 20-n) by using a multipoint control unit (1) connected with the television conference rooms through a communication network (3), said multipoint television conference system comprising:

registration means (14) provided in the multipoint control unit, for registering room names of the television conference rooms and group names of groups into which the television conference rooms are divided;

control means (15) provided in the multipoint control unit, for reading the room names of the television conference rooms not participating in the television conferences, from said registration means and transmitting the read room names to the television conference rooms requiring to hold the television conferences, and for reading the group names from said registration means and transmitting the read group names to the television conference rooms requesting to participate in the television conferences, and operation means (30) provided in the television conference rooms respectively, for receiving and displaying the room names which are produced at said control means and transmitted from the multipoint control unit and selecting a designated room name from the displayed room names, and for receiving and displaying the group names which are produced at said control means and transmitted from the multipoint control unit and selecting a designated group name from the displayed group names.

2. A multipoint television conference system according to claim 1, wherein said registration means (14) comprises registering regions for registering the room names, telephone calling numbers of the television conference rooms participating in the television conferences through the multipoint control unit, the group names and marks indicating promoters of the television conferences.

3. A multipoint television conference system according to claim 2, wherein said control means (15) comprises:

call means for calling the television conference rooms requiring to participate the television conference, using the telephone calling numbers registered in said registering regions of said registration means; and connection means for connecting among the television conference rooms responding to the calls from said call means.

4. A multipoint television conference system according to claim 3, wherein said control means (15) further comprises stop calling means for stopping telephone calling performed to television conference rooms not responding to the calls from said call means, after performing the telephone calling repeatedly a designated number of times, and for informing the room names of the television conference rooms not responding to the calls, to the television conference rooms responding to the calls.

5. A multipoint television conference system according to claim 3, wherein said control means (15) further comprises transmission means for transmitting, to the television conference rooms holding a television conference, information on a television conference room requiring to intermediately participate in the television conference and instructions for sending, to the multipoint control unit, results of judging whether the intermediate participation is accepted.

6. A multipoint television conference system according to claim 5, wherein said information on the television conference room requiring to intermediately participate in the television conference is at least an image of the television conference room requiring the intermediate participation.

7. A multipoint television conference system according to claim 5, wherein said control means (15) further comprises prohibition means for prohibiting the television conference room requiring the intermediate participation from observing images of the television conference rooms holding the television conference and listening voice in the television conference rooms holding the television conference, until the intermediate participation is accepted by the television conference rooms holding the television conference.

8. A multipoint television conference system according to claim 5, wherein said control means (15) further comprises judgement means for judging whether the intermediate participation is accepted in compliance with judging criteria previously established to unanimous agreement, agreement of the promoter of the television conference, decision by majority and absolute right of denial given to one of the television conference rooms holding the conference, and for transmitting results of the judgement to the television conference room requiring the intermediate participation.

* * * * *